No. 691,798. Patented Jan. 28, 1902.
T. W. NORMAN.
MACHINE FOR MAKING CORDS OR ROPES.
(Application filed Nov. 16, 1891.)

(No Model.) 10 Sheets—Sheet 1.

Fig. 1.

WITNESSES:
A. D. Harrison.
H. A. Hall

INVENTOR:
Thos. W. Norman
by

No. 691,798. Patented Jan. 28, 1902.
T. W. NORMAN.
MACHINE FOR MAKING CORDS OR ROPES.
(Application filed Nov. 16, 1891.)

(No Model.) 10 Sheets—Sheet 2.

WITNESSES,
A. D. Harrison.
H. A. Hall

INVENTOR:
Thos. W. Norman
by Wright, Brown & Crossley,
Attys.

No. 691,798. Patented Jan. 28, 1902.
T. W. NORMAN.
MACHINE FOR MAKING CORDS OR ROPES.
(Application filed Nov. 16, 1891.)
(No Model.) 10 Sheets—Sheet 3.

WITNESSES:
A. D. Harrison
H. A. Hall

INVENTOR.
Thos. W. Norman
Wright, Brown & Quinsby,
Attys.

No. 691,798. Patented Jan. 28, 1902.
T. W. NORMAN.
MACHINE FOR MAKING CORDS OR ROPES.
(Application filed Nov. 16, 1891.)
(No Model.) 10 Sheets—Sheet 5.

WITNESSES:
INVENTOR.

No. 691,798. Patented Jan. 28, 1902.
T. W. NORMAN.
MACHINE FOR MAKING CORDS OR ROPES.
(Application filed Nov. 16, 1891.)
(No Model.) 10 Sheets—Sheet 9.

WITNESSES:
INVENTOR:

No. 691,798. Patented Jan. 28, 1902.
T. W. NORMAN.
MACHINE FOR MAKING CORDS OR ROPES.
(Application filed Nov. 16, 1891.)

(No Model.) 10 Sheets—Sheet 10.

WITNESSES.
INVENTOR:

UNITED STATES PATENT OFFICE.

THOMAS W. NORMAN, OF BOSTON, MASSACHUSETTS.

MACHINE FOR MAKING CORDS OR ROPES.

SPECIFICATION forming part of Letters Patent No. 691,798, dated January 28, 1902.

Application filed November 16, 1891. Serial No. 411,969. (No model.)

*To all whom it may concern:*

Be it known that I, THOMAS W. NORMAN, of Boston, in the county of Suffolk and State of Massachusetts, have invented certain new and useful Improvements in Machines for Making Cords or Ropes, of which the following is a specification.

My invention has relation to the art of twisting, laying, and winding or bundling cords and ropes, and it has particular reference to that kind of machines which are adapted to receive spools loaded with yarn or thread, which yarn is drawn off and twisted into strands or cords, the latter being laid up into a rope and coiled, the operation being continuous.

It is the object of my invention to provide improvements in machines of the kind mentioned in the following-mentioned particulars: in means for indicating to the operative when the thread is about to run out from a spool; in means for applying friction to the spools to put the strands drawn therefrom under the desired tension and regulating the latter; in means for winding the strands drawn off from the spools; in means having reference to the capstans, pull-downs, fliers, and coöperating devices; in means for pulling down the completed rope and delivering the same to the bundle-spool; in means for regulating the speed of the take-up spool relative to that of the flier-frame; in means for winding the rope upon the bundle-spool in regular symmetrical coils and under even tension; in means whereby the spool shaft or barrel may be readily collapsed to remove the rope wound thereon; in means whereby the rope may be secured in a bundle of the most convenient form for marketing and use, and in various parts and combinations of parts incidental to those before mentioned.

To these ends my invention consists of the several improvements which I will now proceed to describe and claim, reference being had to the annexed drawings and the letters of reference marked thereon, forming a part of this specification, the same letters designating the same parts or features, as the case may be, wherever they occur.

Of the said drawings.

Figure 1:
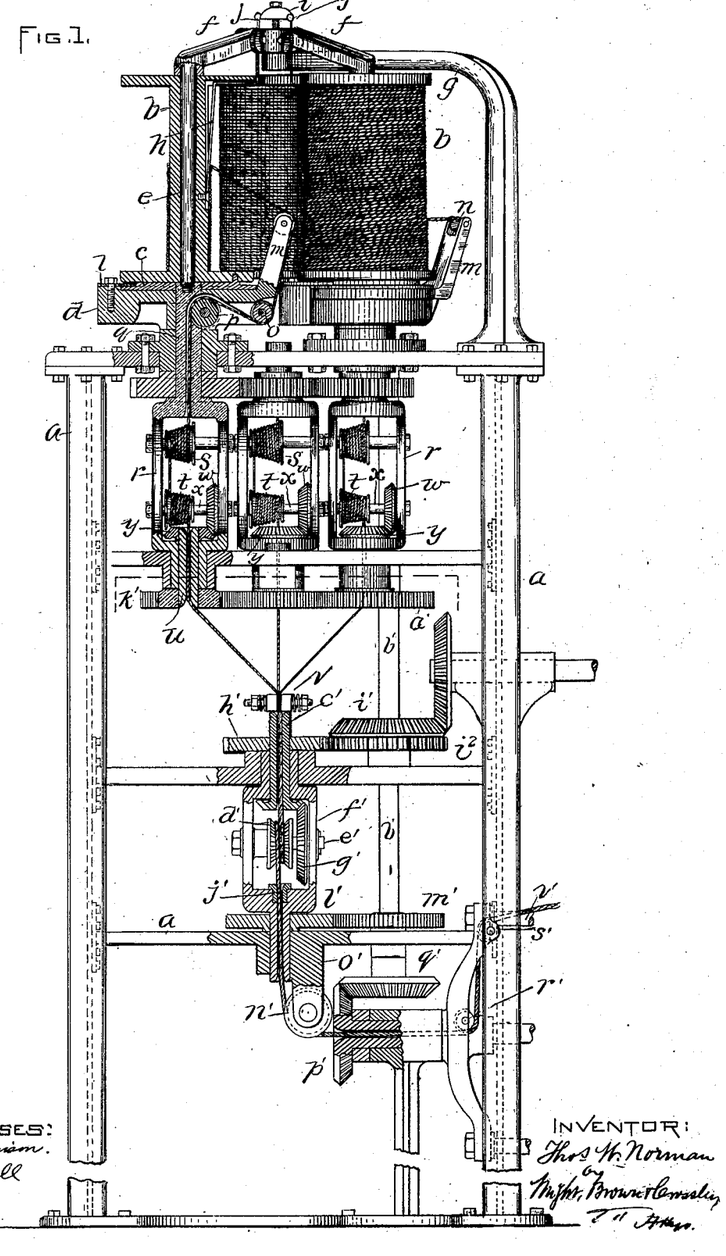
Figure 1 is a front elevation, partially in section, of the upright portion of the machine which supports the yarn bobbins or spools and the means for twisting the same into strands or cords and laying the latter up into a rope.

In the organization of my improved machine, $a$ designates the frame for supporting the movable parts. The portion of the frame shown in Fig. 1 is upright, and upon or in the upper end thereof and properly supported are the bobbins $b$, herein shown as three in number, though there may be two or more.

$c$ designates the immediate bobbin-support, which consists of a friction-disk resting upon a base $d$.

$e$ designates the spool-shaft, provided upon its lower end with a screw-thread, which end is screwed into the hub of the base $d$, that it may be made removable and that it may be readily replaced by another of different diameter to suit spools having barrels of different diameter of bore.

$f$ designates an arm, one for each bobbin, hinged at its inner end upon the upper inner end of a bracket $g$ at a point centrally over the bobbins and resting at its outer end upon the bobbin-shaft $e$, so as to prevent the vibration of the latter. This construction also provides means by folding back the hinged arm for the ready removal and replacement of the bobbins.

$h$ designates a spring-lever secured at one end to the barrel of a bobbin and adapted by the winding of rope thereon to be pressed into a groove in the barrel, the angular portion at the free end being adapted to be pressed into a radial groove in the inner face of the bobbin-head.

Figure 3:
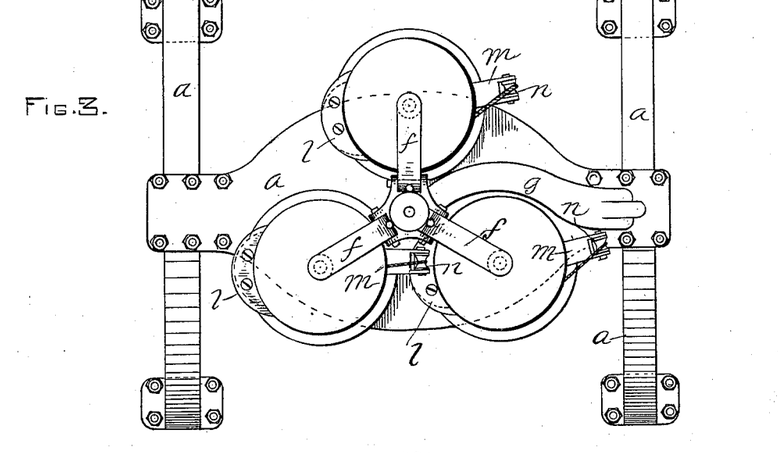
Fig. 3 is a top plan view of the yarn-bobbins and their immediately-associated parts.
Figures 4, 9, 10:
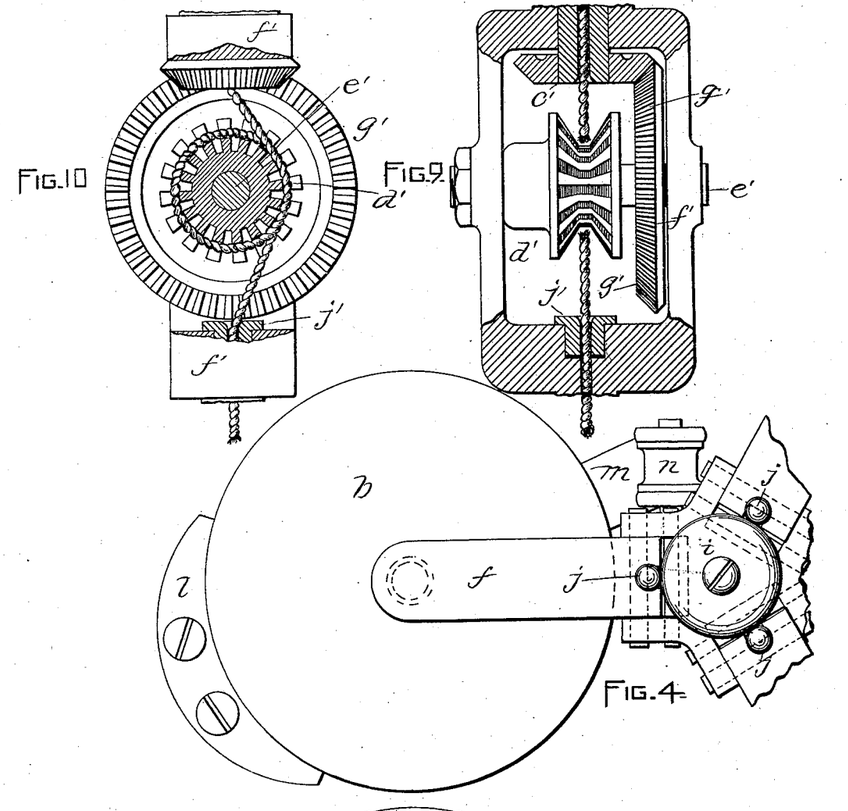
Fig. 4 is a similar view of a single bobbin and its adjunctive devices.
Figs. 9 and 10 show, respectively, side and end views, partially in section, of main pull-down and immediate connections.
Figure 5:
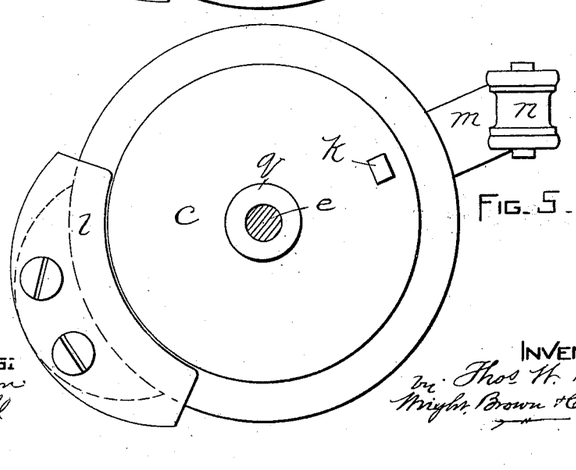
Fig. 5 is a sectional plan view of a bobbin-support and the means for applying frictional resistance to the rotation thereof to put the strands under tension.
Figures 6, 7:
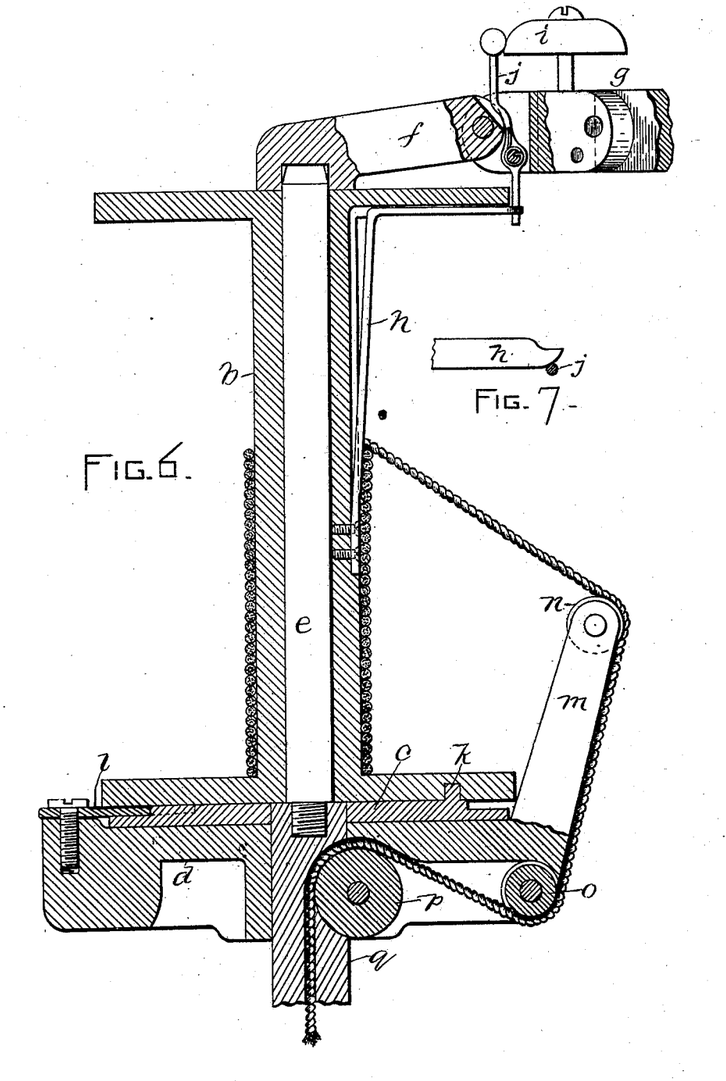
Fig. 6 is a sectional detail view of a bobbin and its immediately-associated parts, a part of a layer of rope being shown on the barrel of the bobbin.
Fig. 7 is a detail view in plan of a fractional part of Fig. 6.

$i$ is a gong located on the bracket $g$, and $j$ is a gong-striking device pivoted in the said bracket with which the outer beveled end of the lever $h$ is adapted to be brought into contact when the said lever is released, as shown in Figs. 6 and 7, and so sound the gong. As is clearly shown in Figs. 3 and 4, a single gong may serve for all of the bobbins.

In use the coiling of the yarn or thread upon the barrel of the bobbin will begin at the end opposite that to which the spring-lever is secured, so that the latter will be released and the gong sounded before the yarn on the bobbin has quite run out, all as will be understood without further description by an inspection of Fig. 6.

The lower spool-head $b$ is provided with a notch or depression into which fits a lug or stud $k$ on the disk $c$. The latter is retarded in its rotation with the bobbin by the pressure thereon of a spring-plate $l$, held upon the base $d$ by two screws, as shown, the degree of pressure being regulated by the degree of tightness with which the screws are turned down.

Figure 8:
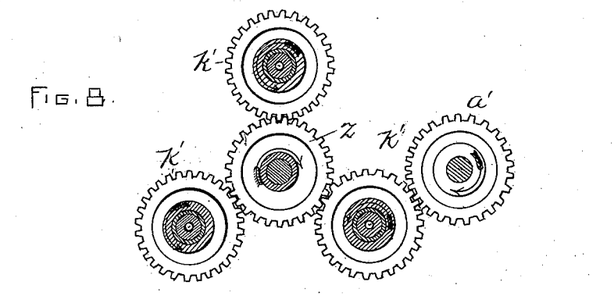
Fig. 8 is a detail plan view showing the arrangement and relationship of the gears above the capstans and below the bobbins and illustrates also the arrangement of the gears below the capstans, whereby the latter are operated.

$m$ designates an arm extending obliquely upward from each of the bases $d$ and provided upon its upper end with a guide-pulley $n$. The thread or yarn leaving the bobbin $b$ passes over the said pulley $n$, thence to and under a pulley $o$, journaled in the base $d$ below the base of the arm $m$, thence to the central pulley $p$ in the hub of the base $d$. Thence it passes through the tube-shaft $q$ of the combined flier and pull-down frame $r$, thence to the first capstan $s$, thence to the second capstan $t$, both in the frame $r$, and thence through the tube-shaft $u$ to the "former" $v$, where the threads are laid up or twisted into a rope. The capstan $t$ is driven by a bevel-gear $w$, fast on the capstan-shaft $x$, the latter gear being in turn driven by a bevel-gear $y$, rigidly fixed upon the upper end of the tube-shaft $u$, which passes through the lower end of the pull-down frame $r$. Each of the said tubes $u$ is rotated by a gear $k$, (see Fig. 8,) the latter engaging a central gear $z$ and the series being operated by a gear $a'$ on the driving-shaft $b'$. The gears shown in Fig. 8 also show the construction and arrangement of the gears on the hubs or shafts of the flier and pull-down frame $r$ for driving the same in conjunction with the base $d$. It is necessary that this last-mentioned set of gears should be of a different size from those first described for driving the capstans in order that a differential motion between the two sets of gears may be secured, so as to cause the capstans to operate slowly, as required.

After the rope leaves the former $v$ it passes through the tube-shaft $c'$ to and around a main or larger pull-down pulley $d'$. (Best shown in Figs. 9 and 10.) The pulley $d'$ has a corrugated face and is journaled on a shaft $e'$, having bearings in the rotary frame $f'$, the said pull-down pulley being driven by a bevel-gear $g'$, fast on the shaft $e'$, which gear $g'$ is engaged by a like gear on the lower end of the tube-shaft $c'$. On the upper end of the tube-shaft $c'$ is a spur-gear $h'$, engaged by a similar gear $i'$ on the driving-shaft $b'$ $i^2$, compounded with the bevel. There is a porcelain tube $j'$ inserted in the rotary capstan-frame $f'$ (see Figs. 1, 9, and 10) to avoid excessive wear upon the frame by the friction of the rope.

Figure 2:
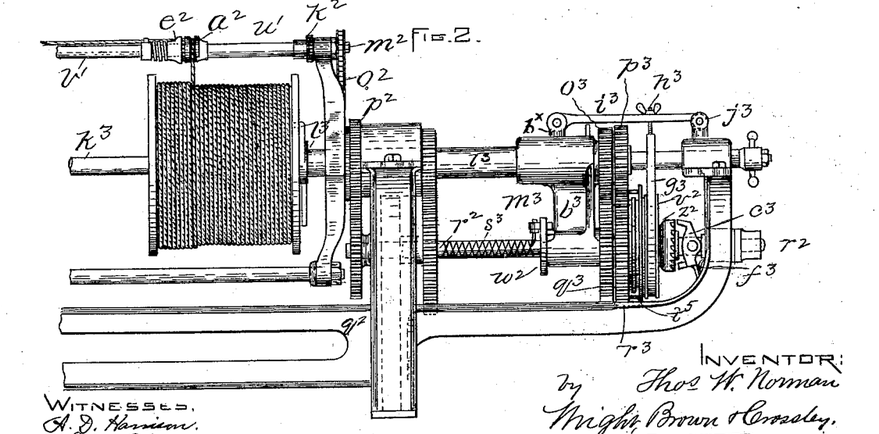
Fig. 2 is a front elevation of the horizontal portion of the machine, embracing the take-up spool or coiler, the reciprocating feed for the spool, and the various frictions or drag for the same.

The main pull-down frame $f'$, Fig. 1, is driven by gear $l'$, secured to the lower portion of its shaft, which is engaged by a gear $m'$ on the driving-shaft $b'$ at a speed slightly faster than the tube-shaft $c'$ is driven. This differential motion is sufficient to secure the necessary slow action of the pull-down pulley. This slightly differential speed heretofore mentioned is required, for the reason that the pull-down or capstan at each revolution may take away, say, six inches of rope, while the pull-down frame may put in, say, for example, merely twelve twists in such length of rope. Hence the tube-shaft through which the captan is operated would be driven eleven-twelfths as fast as the frame, resulting in a differential motion of one-twelfth in the speed of the capstan relative to that of the frame. The rope now passes down over a pulley $n'$, secured to the lower end of a bracket $o'$, connected with the frame $a$, to and through the tube-shaft of a beveled gear $p'$ on the end of a shaft of the take-up or bundling flier. The said gear $p'$ is driven, as shown, by another similar gear $q'$ on the lower end of the main driving-shaft $b'$. The rope next passes over two pulleys $r'$ and $s'$ on the bar or frame of the take-up flier. (See Figs. 2, 11, and 27.) Thence the said rope passes over a pulley $t'$ on the take-up-flier frame to a pull-down mechanism. (See Figs. 27 and 2.)

Detailed views of my pull-down mechanism are shown in Figs. 27 to 32, inclusive.

Figures 27, 28, 29, 30, 31, 32:
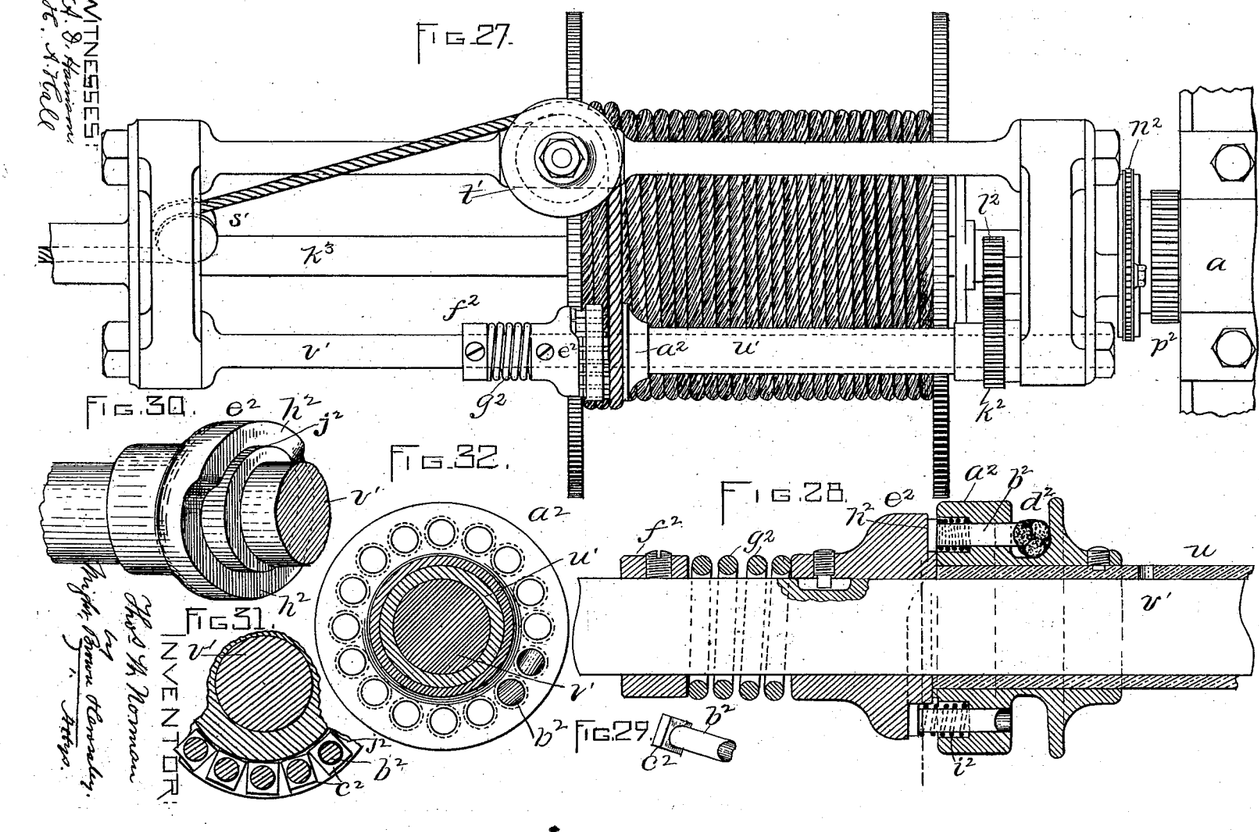
Fig. 27 is a top plan view of the spool, flier, and immediate connections, showing particularly the position of the pull-down on the flier-bar and the driving mechanism for the same.
Fig. 28 is a sectional detail view of the rope pull-down.
Fig. 29 is a perspective view of one of the pull-down or catch bolts.
Fig. 30 is a detail view in perspective designed to show the cam-surface which acts upon the heads of the catch-bolts.
Fig. 31 is a sectional detail view showing the relationship of the bolts and bolt-heads to their actuating-cam.
Fig. 32 is a transverse sectional view of Fig. 28.

My improved rope pull-down, which is arranged on a sleeve $u'$, adapted to be rotated on one of the frame rods or bars $v'$ of the flier, consists of a grooved pulley or hub $a^2$, secured upon the said sleeve, in holes formed in one disk of which are arranged a series of sliding bolts $b^2$, provided on one end with squared heads $c^2$ and having their opposite ends adjacent to the groove $d^2$ of the pulley $a^2$ and which act upon the rope concave in form, as is shown in Figs. 28 and 29. Adjacent to the pulley $a^2$ on the flier-shaft $v'$ is a hub $e^2$, splined upon the shaft $v'$, so as to move longitudinally thereon to a limited extent. A collar $f^2$ is secured to the flier-bar $v'$ a short distance back of the hub $e^2$, and a strong spring $g^2$ is interposed between the said collar and hub, as is best shown in Fig. 28, so that the hub $e^2$ may be held normally up against the hub $a^2$ with a yielding pressure. The outer portion of the face of the hub $e^2$ adjacent to the pulley $a^2$ is constructed as a cam $h^2$, against which the heads of the bolts $b^2$ rest, being pressed back thereagainst by springs $i^2$, interposed between the heads of the bolts and the bottom of the countersinks formed in the pulley $a^2$. It will now be understood that if the rope should be arranged in the groove $d^2$ of the pulley $a^2$ and the latter should be rotated as the heads of the bolts rode up on the higher part of the cam $h^2$ the rope would be grasped by the inner concave ends of said bolts and be carried around and drawn off or down until the heads of the said bolts left the higher part of the cam, when they would release the rope. In the upper part of Fig. 28 a bolt is shown in engagement with the rope, the head of the bolt being on the higher part of the cam, while below there is shown a bolt released from the rope, the head resting upon the lower part of the cam, the spring $i^2$ having pushed the bolt back. The ends of the bolts brought into contact with the rope are concave in form in order that they may present a larger "grip-surface" to the rope and also to prevent abrading the same. The heads of the bolts being square, as shown in Figs. 29 and 31, and one side of such squared head moving in contact with the wall $j^2$ on the inner edge of the cam-surface $h^2$ (see Fig. 31) prevents the bolts from turning and keeps their concave ends in proper position to engage the rope. By adjusting the collar $f^2$ toward and from the hub $e^2$ the force with which the bolts may be made to engage the rope may be adjusted, and the spring $g^2$, interposed between the collar $f^2$ and hub $e^2$, provides means which permits knots, lumps, &c., to pass through the pull-down without injury thereto.

The means for driving the improved pull-down just described is fully shown in Figs. 2, 11, 27, and 34, wherein a spur-gear $k^2$ is shown as secured to the outer end of the sleeve $u'$, said gear engaging another spur-gear $l^2$ on a short shaft $m^2$, which passes through the flier-head and has a sprocket-wheel $n^2$ on its outer end. $o^2$ is a chain which passes over the sprocket-wheel $n^2$ and another sprocket-wheel $n^{12}$, of larger size than the one first mentioned, on a collar $o^{12}$ and connected with a spur-gear $q^2$ on the worm-shaft $r^2$. The said worm-shaft is driven by a gear $s^2$ on the outer end of the flier-sleeve $t^2$, which gear $s^2$ engages a gear $u^2$ on the worm-shaft.

In the operation of the machine herein represented it may be supposed that the pull-down just described in each revolution on the shaft $v'$ carries over it six inches of rope, while that length of rope requires twelve twists or revolutions of the flier to form and complete it. Therefore the sprocket-wheel $n^2$ is geared so as to make one revolution on the flier-frame while the flier rotates twelve on its own axis. This is accomplished by driving, through the gears mentioned, the sprocket-gear $n^{12}$ eleven times in the same direction as the flier during each twelve rotations of the latter, thereby securing a "back-up" or differential motion of one in twelve for the pull-down, as required.

Figure 33:
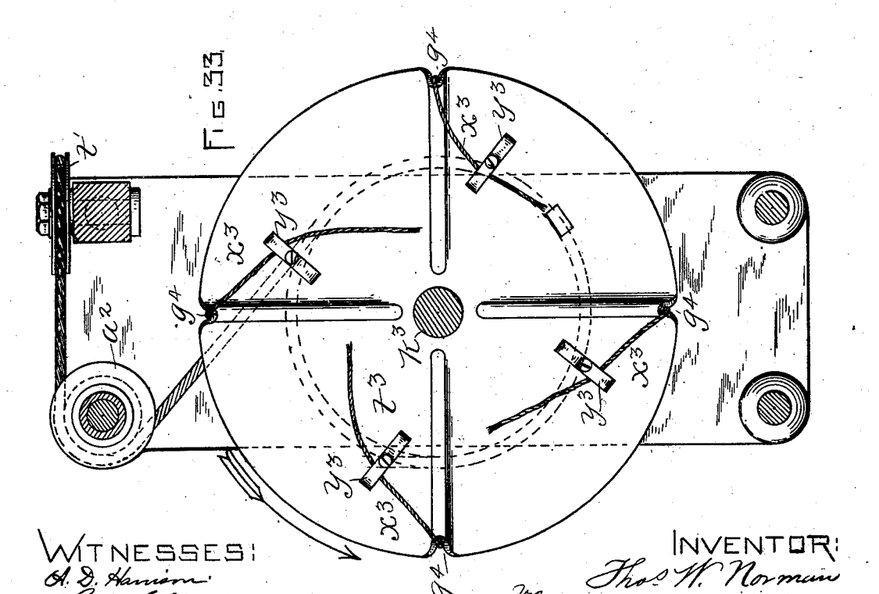
Fig. 33 is a sectional end elevation of a spool and flier.
Figure 34:
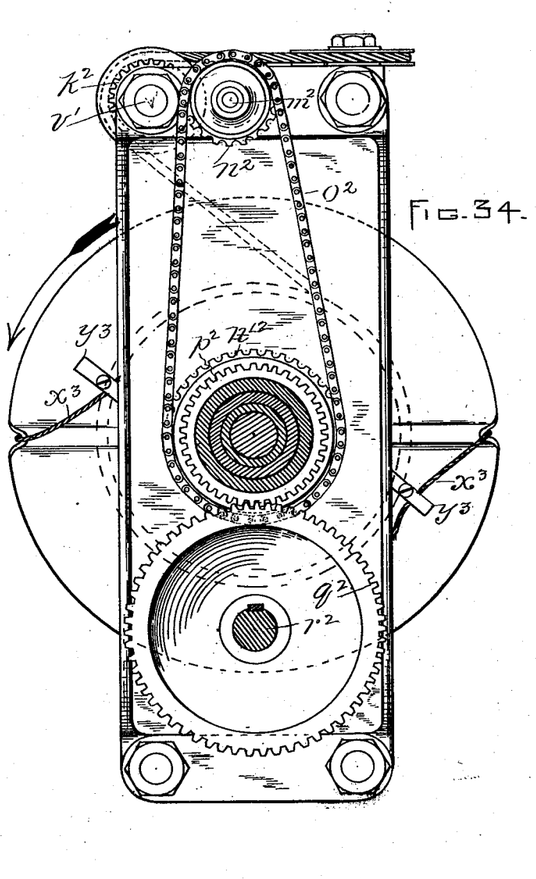
Fig. 34 is a somewhat similar view outside of the flier, designed to show particularly the means for driving the rope pull-down.

The action of the take-up flier as the rope is fed through the pull-down carried thereby is clearly shown in Fig. 33, from which pull-down the rope passes to the spool and is closely coiled thereon. The rope being fed slowly and regularly through the pull-down to the spool haul the latter after the flier at a speed, say, one-thirtieth slower than that at which the flier moves, the speed of the spool increasing only as the diameter of the coil or bundle of rope on the spool increases. The hauling tendency of the rope mentioned also furnishes driving power for the gears $o^3$ and $q^3$, which effect the rotation of the sleeve $w^2$, and consequently the reciprocating motion of the spool. (See Figs. 12 and 13). It will be apparent that a "drag" will be produced on the rope by the friction of this reciprocating mechanism, which will tend to retard the rotation of the spool. This drag, however, will not produce a sufficiently "taut" wound coil or bundle of rope. Hence I have added an extra drag or means of retarding the movement of the spool by providing gears $p^3$ and $r^3$ on the spool and friction-sleeve shafts $l^3$ and $w^2$ of different dimensions from those of the gears $o^3$ and $q^3$ and have added friction-flange $s^5$, which runs free on shaft $w^2$ to further retard the movement of said gears and increase the friction. (See Figs. 2, 11, and 12.) Friction-flanges $t^5$ and $v^2$ are splined on shaft $w^2$. Again, as the diameter of the coil or bundle of rope on the spool increases the leverage of the rope upon the friction devices also increases, and to offset this and to preserve a uniform tension on the coil I have added means for automatically increasing the friction.

Figure 12:
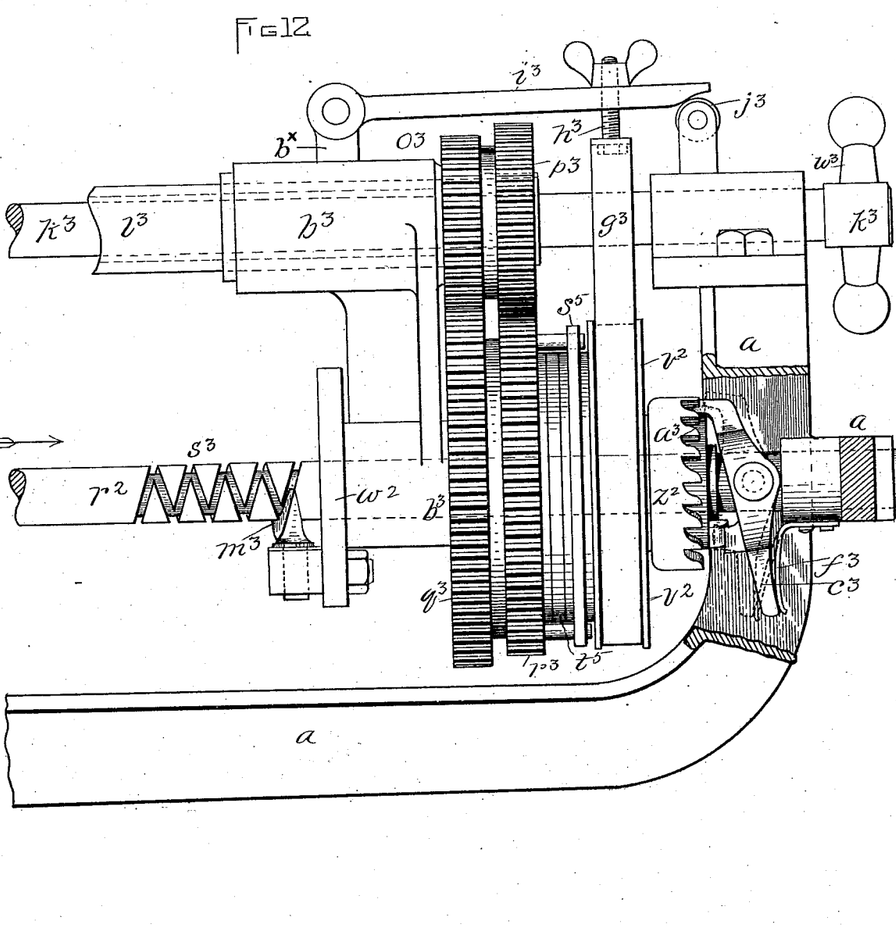
Fig. 12 is a side elevation, on an enlarged scale, of parts shown in Fig. 11.
Figures 14, 15, 16, 17, 18, 19, 20, 21:
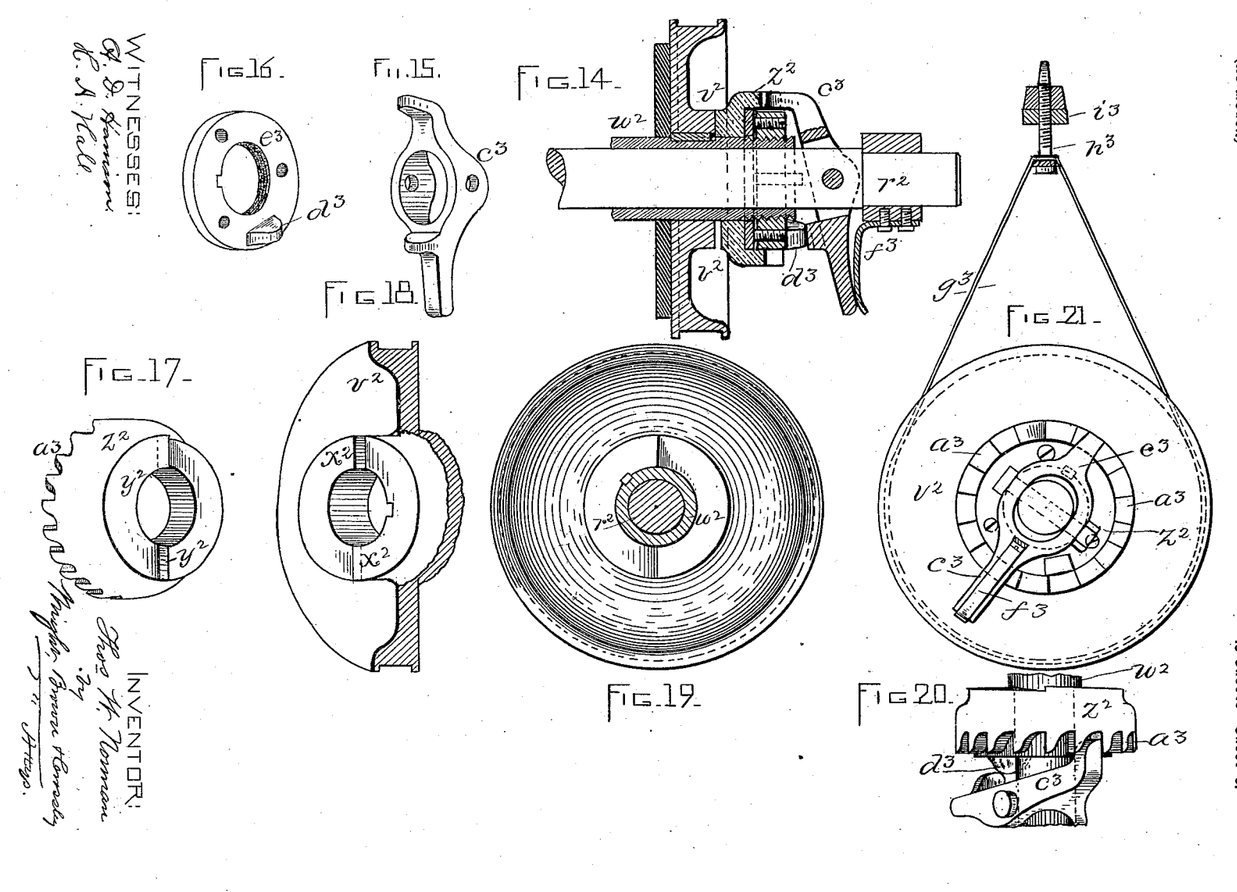
Fig. 14 is a central sectional view of the parts immediately concerned in operating and varying the friction and also in effecting a variation of tension on the rope and securing the perfect winding of the same.
Fig. 15 is a perspective view of the dog shown in Fig. 14 and several other views.
Fig. 16 is a perspective view of the nut which acts directly upon the dog to effect an increase of friction.
Fig. 17 is a perspective view of the clutch part upon which the dog acts directly.
Fig. 18 is a friction-disk upon which the part shown in Fig. 17 acts directly.
Fig. 19 is a transverse sectional view of parts shown in Fig. 14.
Fig. 20 is a perspective view of parts shown in Fig. 14.
Fig. 21 is an end view, partly in section, of portions of the devices shown in Fig. 12.

$v^2$ designates a disk constructed as a pulley splined on the sleeve $w^2$, arranged to reciprocate upon the worm-shaft, (and which sleeve $w^2$ carries the friction gear and disks employed to control the motion of the spool,) between which disk $v^2$ and gear $r^3$ are interposed one or more friction-disks $s^5$ and $t^5$. The outer face of the hub of the disk $v^2$ is constructed as a double cam $x^2$, which is arranged to coöperate with a similar cam $y^2$, formed on the inner face of the hub of the clutch part $z^2$. (See Figs. 18 and 17.) Teeth $a^3$ are formed on the periphery of the outer face of the clutch part $z^2$, which teeth as the reciprocating carriage $b^3$ (which is moved by the fork $m^3$, engaging the threads of worm-shaft $r^2$,) reaches the outward limit of its travel are adapted to be engaged by a dog $c^3$, pivoted upon the worm-shaft $r^2$, by reason of a cam $d^3$ on the outer face of a nut $e^3$, screwed on and made rigid by a spline with the sleeve $w^2$, coming in contact with the lower arm of the dog, as shown in Figs. 12, 14, and 20.

It will be remembered that the flier rotates at a somewhat faster speed than the spool. Hence the engaging of the dog $c^3$ with the teeth of the clutch part $z^2$ can only be of momentary duration. During this period, however, the clutch part $z^2$ "tightens up" on the disk $v^2$ by reason of the action of cams $y^2$ upon cams $x^2$. As soon as the cam $d^3$ passes from under the lower arm of the dog $c^3$ the spring $f^3$ will operate upon the said arm to disengage the dog from the teeth $a^3$ of the clutch part $z^3$. By the time the cam $d^3$ comes around again the carriage will have been moved inward by the traveler or fork $m^3$, engaging screw $s^3$, a distance sufficient to permit the said cam to then pass the dog without affecting it.

I have found that the frictional connection between the dog $c^3$ and cam $d^3$, together with the force required to tighten up the clutch part $z^2$, is greater than the friction-drag of the gear $r^3$ and friction-flanges. This causes the spool to lock with the flier and the two to rotate at the same speed. The result of this is the failure of the rope to coil or be wound upon the spool. To avoid this, I have supplied the momentary extra friction shown in Figs. 2, 11, 12, and 21, wherein a belt $g^3$ is shown as passed about the periphery of the disk $v^2$ and engaged with the head of a thumb-screw $h^3$ thereabove. The said thumb-screw passes through the outer portion of a bar $i^3$, which is pivoted at its inner end upon a lug or bracket $b^\times$, connected with the carriage $b^3$, and has its outer end beveled, so as to ride up on a pulley or roller $j^3$, having bearings in a stationary part of the frame $a$, at the time the carriage reaches the outward limit of its movement and at the moment the dog $c^3$ engages the teeth of the clutch part $z^2$, so as to supply enhanced friction to the disk $v^2$ and compel the dog to operate and avoid locking of spool and flier, as before mentioned.

It will be seen that the clutch part $z^2$ has a given number of teeth $a^3$ on its outer periphery or edge and also that it has two half-way round or double cams $y^2$. The teeth $a^3$ are arranged in the ratio of one to every two layers of rope in a coil, as in the construction here shown. The dog operates on the clutch only at every other layer or when the carriage reaches the limit of its outer travel. It is to be noted also that the cam $y^2$ by being made double, as described, is better balanced than though it were single, since a single cam between the parts $v^2$ and $z^2$ would throw said parts "out of true." For example, if the part $z^2$ had nine teeth half-way around its surface it would operate for a coil of eighteen layers and would then snap back to its starting position, thereby releasing the friction gears and flanges from undue friction or pressure, so that the parts would be in position for a change of spool and the beginning of a new coil or bundle of rope without readjustment by hand of the friction mechanism. Should more than eighteen layers be required in a coil or bundle, a clutch part $z^2$ would be supplied having teeth $a^3$ in number to suit.

Figure 13:
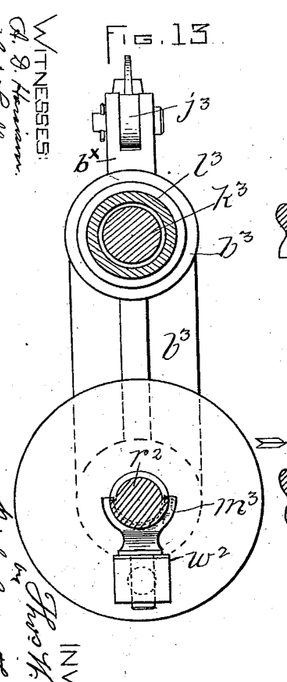
Fig. 13 is a transverse sectional view of parts represented in Fig. 12.

In Fig. 13 there is shown an end view of the spool-rod $k^3$, spool-sleeve $l^3$, fork or traveler $m^3$, and worm-shaft $r^2$.

I will next proceed to describe as a part of my invention a spool having a bearing longitudinally of the flier and the improved form of means employed to operate the spool in order to coil the rope perfectly thereon, as well also as the means for knocking down the spool and removing and bundling the rope. $n^3$ designates a dog on the spool-shaft $l^3$, (made hollow or constructed as a sleeve,) which is adapted to engage one end of the spool and connect the same with the spool-shaft, so as that it will turn therewith. The gear $o^3$ on the outer end of the spool-shaft $l^3$ connects with the gear $q^3$, rigidly fixed on the friction-shaft $w^2$, and operates the latter in unison with the spool. Upon the inner end of the shaft $w^2$ and supported by the same is the traveler or fork $m^3$, which as the said shaft is rotated by means of the differential motion between the flier and the spool traverses the worm-groove $s^3$, formed in the worm-shaft, and effects a movement of the carriage $b^3$ and spool-shaft $l^3$ to and fro.

It should be explained that the differential motion between the flier and the spool is exactly sufficient to wind the rope up into even and close coils upon the spool, and even though the diameter of the coil or bundle increases as the spool fills this differential motion decreases at the same time in the same ratio, thereby effecting the action of the spool-reciprocating devices, as shown above, and giving the necessary extra time for the machine to furnish more rope for the extra circumference caused by its last layer, and so it becomes of its own accord its own governor in laying the rope onto the spool in regular close coils.

Referring again to Fig. 33, it will be seen that the flier in its revolution tends to haul the take-up spool $t^3$ after it. I have hereinbefore referred to this action as furnishing power not only to rotate the spool, but also to operate all of the means whereby the spool is traversed and regulated in its motions to effect the perfect coiling of the rope thereon. In the traversing operation of the spool the friction-shaft $w^2$ is rotated at a different speed from the worm-shaft, causing the fork or traveler $m^3$ to traverse the worm-groove $s^3$, and it is to be noted that this traverse coming from the spool, as shown, is self-adjusting as respects the laying of the rope onto the spool in even coils when properly geared to do so. It will be noticed that the spool $t^3$ "backs up" somewhat as it follows the speed of the flier. Now if the rope pull-down on the bar $v'$ did not operate to feed out the rope to the spool $t^3$ the latter would run in unison with the flier and no action would be given to the traveler $m^3$—that is, there would be no differential motion between the worm-shaft $r^2$ and the fork-shaft $w^2$; but the pull-down aforesaid being operated at a given speed, as shown, feeds forward the rope at a regular rate, and the drag on the rope being the propelling power for the spool hauls the latter along at a slower rate than the flier, the friction between the flier and the spool operating to control the relative speed between the spool and flier, so as to effect a feeding forward of the rope at a regular rate, as aforesaid, no matter what the circumference of the bundle on the spool may be. This operates to give one differential revolution of the spool with respect to the flier in each circle or turn of rope laid upon the spool. This differential motion I employ in operating and controlling the operation of the traveler or fork $m^3$, which at each differential revolution of the spool operates to move the carriage and spool the required distance to make room for the next coil or circle, and so on. Now it will be noted that the gear $s^2$ on the flier-shaft $t^2$ and the gear $u^2$ on the worm-shaft, with which the gear $s^2$ engages, are of different size, and the same thing is true of the gear $o^3$ on the spool-shaft $l^3$ and the gear $q^3$ below on the traveler or friction-shaft $w^2$. This variation in the size of the gears is made in order to effect the "slowing down" of the side-to-side traversing action of the traveler or fork in this instance to such a degree that the traveler will make but one-half a revolution of the worm-shaft while a complete coil is being laid upon the spool, the reason for this being that the pitch of the groove $s^3$ on the worm-shaft $r^2$ is double that described by the rope wound upon the spool $t^2$ at each backward revolution, so that the spool will "back down" two revolutions in its race after the flier and lay two coils while the traveler $m^3$ makes one revolution of the worm-shaft $r^2$.

I find that I can vary the side-to-side feed motion of the spool to any other proportion than that above mentioned by varying the size of the four gears last hereinbefore noted.

Figures 11, 22, 23, 24, 25, 26:
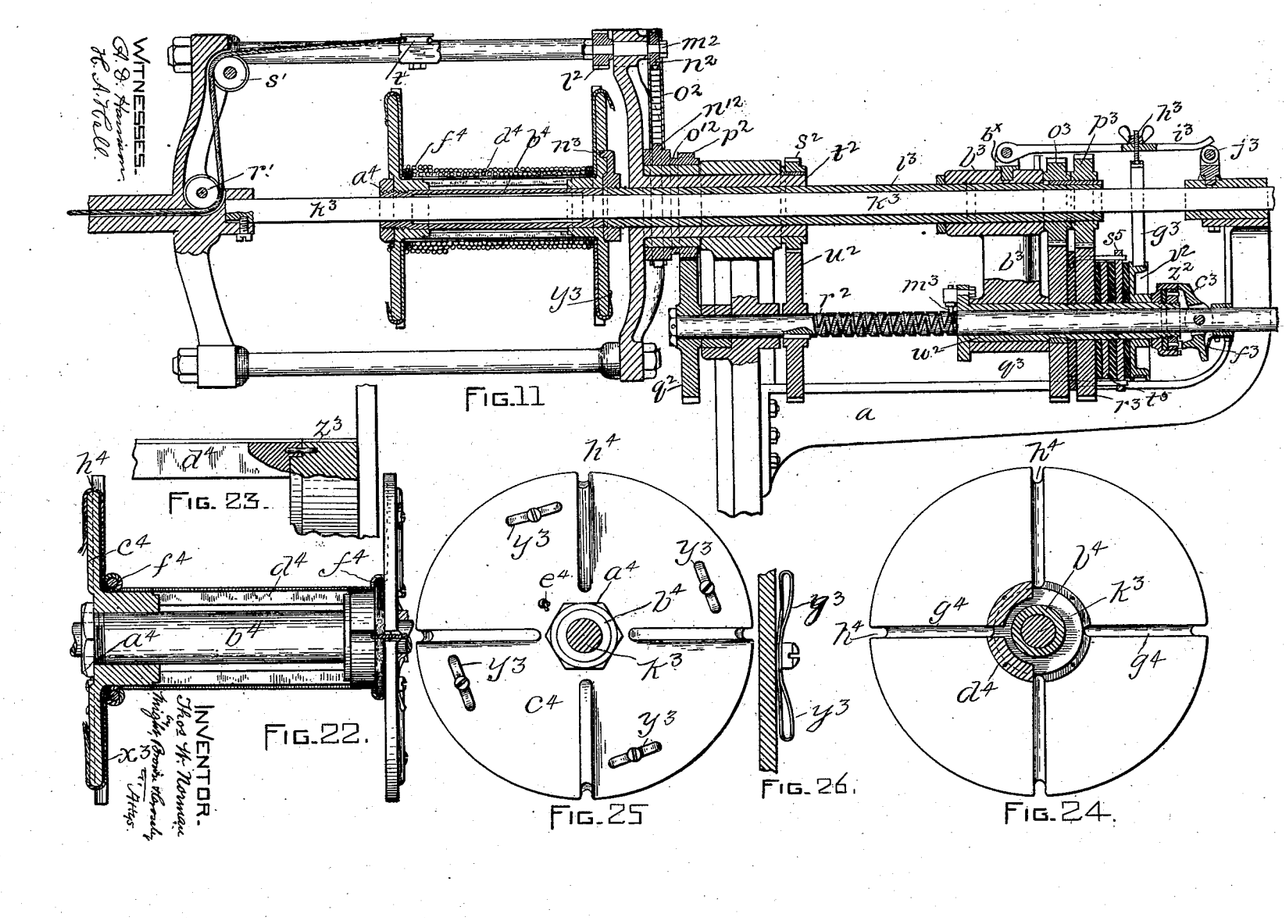
Fig. 11 is a central sectional view of most of the parts represented in Fig. 2.
Fig. 22 is a side elevation, partially in section, of the improved knockdown, take-up, or bundle spool.
Fig. 23 is a sectional detail view of the same and showing but two of the four segmental staves which compose the barrel of the spool.
Fig. 24 is a sectional view looking at the inside of a spool-flange. Fig.
Fig. 25 is a similar view looking at the outside of a spool-flange.
Fig. 26 is a sectional detail view showing a spring-cleat on an enlarged scale.
Figure 36:
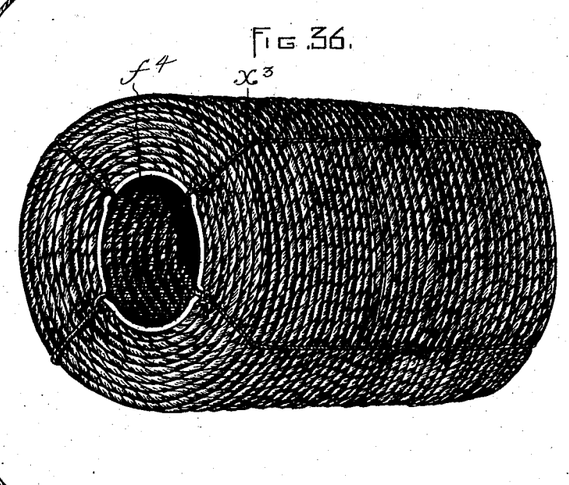
Fig. 36 is a perspective view of a coil or bundle of rope as it comes from my improved collapsible spool.

My improved collapsible spool is best shown in Figs. 11, 22, and 23. Supposing the spool to be full and that it is wanted to remove it from the machine, I may first release the dog $n^3$ to release the spool from the spool-shaft $l^3$, and then by a twist or partial rotation of the flier-shaft $k^3$ by a manipulation of the handle $w^3$, Fig. 12, I unlock the inner end of the latter shaft from its bayonet-joint connection with the flier (see Fig. 11) and draw it outward, having first cut the rope, thereby freeing the spool from the machine. I then remove the free ends of the cords $x^3$ from under the spring-cleats $y^3$ on the ends of the spool (the other ends of the cords being secured to rings $f^4$ on the ends of the spool-barrel) and tie the ends of opposite cords together over the bundle, as is shown in Fig. 36. I next remove the nut $a^4$ from the spool-tube $b^4$ and withdraw the spool end or disk $c^4$ therefrom, when the four segmental staves $d^4$, supported on the hubs of the spool ends or disks and constituting the barrel of the spool, as indicated in Fig. 24, will collapse and the segments and spool-tube $b^4$ can easily be removed and the spool readjusted and placed again in the machine.

As is represented in Fig. 26, the cleats $y^3$ are constructed as a spring, so contrived as that the ends of the band $x^3$ may be drawn thereunder and held clamped between the same and the end of the spool, so as to make knotting or tying the ends of the cords unnecessary.

After the empty spool has been placed in proper position in the machine I take the end of the rope from the pull-down on the flier-frame and pass it through a hole $e^4$, (shown in Fig. 25,) formed through the end of the spool, making a knot on the end to secure it in position to insure its winding on the spool-bearer, as is represented in Figs. 11 and 22. Before readjusting the spool, as mentioned, I place on the ends of the spool-bearer $z^3$, adjacent to the heads or disks of the spool, a metal ring $f^4$, having four bands or cords $x^3$ tied to each ring at quarter-points thereof, and having set up the spool I bring the end of each cord or band up over the end or disk of the spool through the grooves $g^4$ and notches $h^4$ in the periphery (shown in Fig. 24) and fasten the free ends under the cleats $y^3$, as is clearly portrayed in Fig. 33.

Fig. 36 represents a finished ball or coil of rope as it comes from the machine, the inner and intermediate layers being as evenly wound as that of the outer layer.

Figure 35:
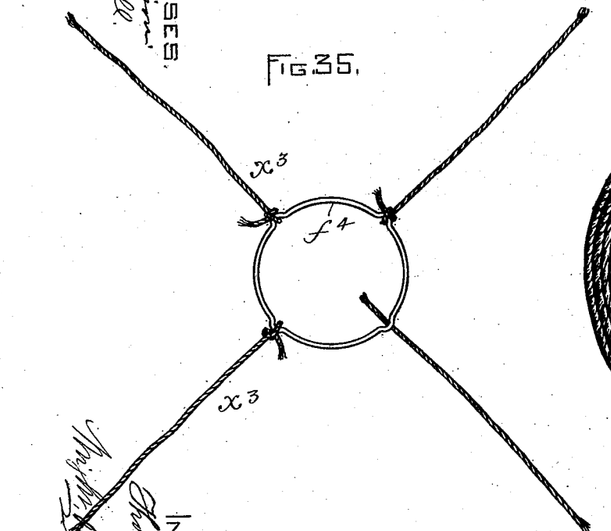
Fig. 35 is a plan view of a part of the bundling means.

The rings $f^4$ (represented in Fig. 35, where the cords are also shown as attached thereto) can be formed of any suitable material—such as metal, wood, or fiber; but in every instance the rings at each end of the ball or spool must not be connected through the hole in the ball or coil by any cord or band, since it is the intention with this feature of the invention to make these balls or coils available to unwind the rope from the center, so that the center must be left free. In the coils shown and described in my former application the bands go through and around the ball, and hence the rope cannot be unwound until the bands are cut and either a suitable support is given inside or until the rope is rewound into balls which adapt it to be withdrawn from the center.

While I have been particular in the description of the construction, arrangement, and operation of the means represented in the drawings, it is obvious that these may be changed within the limits of mechanical skill without departing from the nature or spirit of my invention.

What I claim as of my invention is—

1. The rotatable bobbin or spool having its barrel longitudinally grooved, and having a radial groove in its head or disk, a relatively stationary gong, a relatively stationarily mounted gong-striking device, and an angular spring-lever secured at its end to the barrel of the bobbin and extending along the groove in the same, and having an end extending up in a radial direction in the groove in the head or disk and adapted to impinge upon the gong-striking device to operate it, substantially as set forth.

2. The combination with the relatively stationary gong and the relatively stationarily mounted gong-striking device, of a rotatable drum having a disk with a radial groove, and an angular spring-lever secured at one end to the barrel and having a bent end lying in the radial groove and adapted to operate the gong-striking device, substantially as and for the purposes set forth.

3. The revoluble bobbin or spool, a base or support $d$ therefor, and a tubular shaft $q$ relatively to which said bobbin may revolve, in combination with an upwardly-extending arm $m$ rigid with said base and shaft, a guide-pulley $n$ on the upper end of said arm, a guide-pulley $o$ in the base below the lower end of said arm, and a third guide-pulley $p$ arranged below the bobbin so that the axis of the tubular shaft is substantially tangential to its periphery, as set forth.

4. A revoluble base or support, a bobbin or spool revoluble relatively thereto, and a tubular shaft $q$, rigid with the base or support, in combination with an arm, $m$, having a pulley $n$ on its upper end, and a pulley $o$ below its lower end, and a pulley $p$ having bearings rigid with the shaft, and having one side of its periphery in line with the opening in the said tubular shaft.

5. The combination, with the bobbin and its base or support and hub $d$ connected therewith of the capstan-flier $r$ provided with a tubular journal-shaft $q$ extending into said hub, a pulley $p$ journaled in the latter, and a pulley $o$, supported in the lower part of the base near the edge thereof, as set forth.

6. A rope pull-down, comprising in its construction a pulley or hub $a^2$ having a groove affording a guide or bearing for the rope, longitudinally-movable bolts $b^2$ in the said hub for engaging and being disengaged from the rope, a cam for moving the said bolts into engagement with and gripping the rope, and springs for moving them in the opposite direction combined with the flier-shaft and its sleeve upon which the said pulley is located.

7. A rope pull-down comprising in its construction a pulley or hub $a^2$ provided with a groove $d^2$ for the passage and guiding of the rope, longitudinally-movable bolts $b^2$ supported in the hub, a hub or collar $e^2$ provided with a cam-face $h^2$ for acting upon the bolts to cause them to engage and grip the rope, and springs $i^2$ for moving the bolts in the opposite direction, combined with the flier-shaft and its sleeve upon which the said pulley is located.

8. A rope pull-down comprising in its construction a pulley or hub $a^2$ provided with a groove $d^2$ for the passage and guiding of the rope, longitudinally-movable bolts $b^2$ supported in the hub, a hub or collar $e^2$ provided with a cam-face $h^2$ for acting upon the bolts to cause them to engage and grip the rope, and springs $i^2$ for moving the bolts in the opposite direction, means for holding the cam-face of the said hub $e^2$ against the bolts by a yielding pressure, as described.

9. A rope pull-down comprising in its construction a pulley or hub $a^2$ provided with a groove $d^2$, for the passage and guiding of the rope, longitudinally-movable bolts $b^2$ supported in the hub and having concaved ends and squared heads, as described, a hub $e^2$ provided with a cam-face $h^2$ and a wall $j^2$ at the side thereof, for acting upon the heads of the bolts to move the latter into engagement with the rope, and springs for moving them in the opposite direction, as set forth.

10. A rope pull-down, comprising in its construction a grooved pulley or hub $a^2$ affording a guide or bearing for the rope, longitudinally-movable bolts in the said hub for engaging and being disengaged from the rope, a cam for moving the said bolts into engagement with the rope, and springs for moving them in the opposite direction, the said bolts being provided with squared heads and concaved ends, combined with the flier-shaft and its sleeve upon which the said pulley is located.

11. A collapsible spool having the barrel $b^4$ and surrounding segments $d^4$ and provided on its ends with the spring-cleats $y^3$, as set forth.

12. A collapsible spool, combined with rings $f^4$ adapted to be placed on the ends of the barrel, for attachment of the bundling-cords $x^3$, and said spool having means for maintaining the bundling-cords in place where attached.

13. The combination, with the flier and its shaft, gear $s^2$ thereon, the worm-shaft, gear $u^2$ thereon meshing with the gear $s^2$ and differing in size therefrom, the spool-shaft, gear $o^3$ thereon, the traveler and its shaft, gear $q^3$ on the traveler-shaft, differing in size from gear $o^3$, as set forth.

In testimony whereof I have signed my name to this specification, in the presence of two subscribing witnesses, this 5th day of November, A. D. 1891.

THOMAS W. NORMAN.

Witnesses:
ARTHUR W. CROSSLEY,
C. F. BROWN.